United States Patent
Herod et al.

(10) Patent No.: US 7,459,120 B2
(45) Date of Patent: Dec. 2, 2008

(54) LOW PRESSURE THERMOFORMING OF THIN, OPTICAL CARRIERS

(75) Inventors: Timothy E. Herod, Seminole, FL (US); Hsinjin E. Yang, Palm Harbor, FL (US)

(73) Assignee: Essilor International (FR)

( * ) Notice: Subject to any disclaimer, the term of this patent is extended or adjusted under 35 U.S.C. 154(b) by 670 days.

(21) Appl. No.: 10/727,818

(22) Filed: Dec. 4, 2003

(65) Prior Publication Data
US 2005/0121835 A1 Jun. 9, 2005

(51) Int. Cl.
B29C 51/10 (2006.01)
B29C 51/18 (2006.01)
B29C 51/36 (2006.01)
G02C 7/02 (2006.01)
G02B 5/00 (2006.01)

(52) U.S. Cl. .................... 264/544; 264/2.7; 264/553; 425/388

(58) Field of Classification Search ............ 264/492, 264/544, 523, 553, 526, 2.7; 425/388
See application file for complete search history.

(56) References Cited

U.S. PATENT DOCUMENTS

| | | | | |
|---|---|---|---|---|
| 3,172,159 A | * | 3/1965 | Edwards | 425/346 |
| 3,342,914 A | * | 9/1967 | Edwards | 264/549 |
| 3,753,830 A | * | 8/1973 | Cruckshank et al. | 156/382 |
| 4,526,831 A | * | 7/1985 | Hatchadoorian et al. | 428/300.7 |
| 4,536,148 A | * | 8/1985 | Murley et al. | 425/387.1 |
| 4,880,581 A | * | 11/1989 | Dastoli et al. | 264/39 |
| 5,082,515 A | * | 1/1992 | Cartier et al. | 156/212 |
| 5,108,530 A | * | 4/1992 | Niebling et al. | 156/245 |
| 5,169,569 A | | 12/1992 | Ingram et al. | |
| 5,217,563 A | | 6/1993 | Niebling, Jr. et al. | |
| 5,237,796 A | * | 8/1993 | Bonkowski | 53/398 |
| 5,524,419 A | | 6/1996 | Shannon | |
| 5,649,438 A | * | 7/1997 | Hall et al. | 72/60 |
| 5,683,648 A | * | 11/1997 | Fortin | 264/550 |
| 5,686,186 A | * | 11/1997 | Enlow et al. | 428/423.1 |
| 6,010,323 A | | 1/2000 | Sekino | |
| 6,257,866 B1 | | 7/2001 | Fritz et al. | |
| 6,562,466 B2 | | 5/2003 | Jiang et al. | |

FOREIGN PATENT DOCUMENTS

DE 1 951 8211 10/1996
EP 1 236 561 9/2002

* cited by examiner

*Primary Examiner*—Matthews J. Daniels
(74) *Attorney, Agent, or Firm*—Keusey, Tutunjian & Bitetto, P.C.

(57) ABSTRACT

A method for thermoforming a thin thermoplastic carrier with uniformity of thickness at optical quality. The sheet to be thermoformed is heated and placed on a vented platform equipped with a mold insert. The thermoformer's platens clamp a shroud over the sheet. A low pressure air stream is introduced into the shroud and deflected from a direct path leading to the mold insert.

30 Claims, 4 Drawing Sheets

LOW PRESSURE THERMOFORMING OF THIN, OPTICAL CARRIERS

BACKGROUND OF THE INVENTION

1. Field of the Invention

The present invention relates to a method for low pressure thermoforming uniformly thin carriers at optical quality.

2. Description of the Related Art

A semi-finished lens that has been ground and polished to a specific prescription loses the standard protective coating on its back surface. A technique known as Back Side Transfer (BST) of Hard Multicoated Lenses (HMC) is one available process to add a coating onto the ground and polished back surface of such semi-finished lenses. BST is detailed in U.S. Pat. No. 6,562,466 which is assigned to the present applicant. In summary, a protective coating is applied to a thin plano carrier and brought into contact with the ground and polished back surface that has been covered with an optical adhesive. The carrier is compressed against the adhesively coated back surface by an air bladder and held in place until the adhesive cures. The carrier is subsequently removed, leaving the protective coating adhered to the back surface. The quality of such protective coatings is heavily dependent on several characteristics of the carrier. More particularly, the key characteristics of the carrier are: its thinness which contributes to its conformity to the back surface; its optical quality even though it is removed from the final lens; and the uniformity of thickness across the carrier's surface.

Previously, relatively simple carrier thermoforming methods, such as drape forming, matched mold, vacuum forming, and free blown forming have produced carriers of only mediocre quality. A high pressure thermoforming method described in U.S. Pat. Nos. 5,108,530 and 5,217,563 produces carriers of acceptable quality for a limited range of sizes and geometries. However, the high pressure method requires complex systems to control the heat and pressure that develop within the large scale equipment. As the mass of the equipment rises, it becomes increasingly difficult to control the temperature and other process parameters which affect quality control. Ultimately, the difficulty and expense of operating such high pressure systems outweighs the benefits and yields of acceptable carriers. Accordingly, it would be desirable to provide a simpler method utilizing low cost equipment to provide a greater yield of carriers in a larger range of sizes and geometries.

SUMMARY OF THE INVENTION

It is therefore an object of the present invention to provide a low pressure thermoforming method for manufacturing carriers of high quality.

It is a further object of the present invention to carry out such method on simple, inexpensive equipment.

It is yet another object of the present invention to provide a high yield of carriers that are thin, that are of optical quality, and that have uniform thickness. These and other related objects are achieved by a method for thermoforming a thin thermoplastic carrier with uniformity of thickness at optical quality including the steps of locating a heated sheet on a vented platform equipped with a mold insert and clamping the thermoformer's platens, subsequently confining a low pressure air stream within a shroud having a geometry matched to the mold insert's periphery, and further deflecting the air stream from a path leading directly to the mold insert.

The method further includes circulating a heating medium through circulating channels within the vented platform and through circulating channels within a sub-platform spaced from the vented platform to form a gap therebetween which communicates with the vents. The heating medium has an operational temperature in the range of 100 degrees F. to 200 degrees F., with a preferred temperature range of 115 to 145 degrees F. As a result, the heating of the vented platform raises the air temperature in the vicinity of the mold insert to about 80 to 180 degrees F., with a preferred range of 100 to 130 degrees F. The vented platform heats one side of the sheet and the air stream heats the other side of the sheet. The method also provides for circulating a cooling medium through channels within a support platform and sandwiching an insulating plate between the sub-platform and the support platform.

Conveniently, a standard injection mold insert can be utilized in the thermoforming method according to the invention. The standard injection mold insert is equipped with a base member that is installed through the vented platform and gap into a receiving port formed within the sub-platform. The position of the mold insert is adjusted to lie even with the vented platform surface and the base member is locked into position within the receiving port.

The sheet is prepared by removing a protective film from the sheet, fixturing the sheet within a sled and heating the sheet to, or just above, its glass transition temperature, all within a positive HEPA airflow environment. Heating involves IR heating the sheet at a rapid rate to reduce the time between removing the film and locating the sheet. Such IR heating by radiation at a wavelength tuned to the thermoplastic's absorption band, can effectively raise the temperature of the sheet to between 80 and 250 degrees F. within less than about 15 seconds. Such sheet may be in the range of between 0.01 and 0.10 inches thick, whereby good results have been noted for sheets of 0.02 inches thick.

The thermoformer clamps a shroud onto the vented platform with an operational clamping force between 22 psi and 300 psi on each platen, preferably between 70 and 85 psi on each platen. The clamping force on the lower platen should be the same as the clamping force on the upper platen. The shroud includes an open end facing the vented platform and having the same geometric shape as the mold insert's periphery. Along its height, the shroud may include at least one cross-sectional shape with the same geometric shape as the mold insert's periphery. In one embodiment, the shroud has a uniform cross-sectional shape along its height. For circular mold inserts having a radius r, the shroud's open end is also circular having a radius R, larger than r. In an easily manufactured form, the shroud is cylindrical. In relation to the mold insert, the shroud's cross-sectional area at its open end face is less than two times larger than the area of the mold insert. The vented platform's vents are located at a radius V, in which $r < V < R$.

In a particularly efficient embodiment, the method includes simultaneously thermoforming several carriers. Such method would have the steps of locating a heated sheet on a vented platform equipped with multiple mold inserts, subsequently providing one geometry-matching shroud for each mold insert and then deflecting the air stream within each shroud. In the single carrier or multi-carrier forming mode, the air stream typically emanates from an open inlet located at the top of a cylindrical shroud and all paths leading from the inlet to the mold insert collectively form a cone. The method contemplates positioning a deflector within at least part of the cone. The deflector may be connected to the shroud interior and may be formed as a baffle, a plate, a screen, or combinations thereof. Alternatively, the air inlet may be equipped with a diverter or diverter tube for deflecting the air stream. The air inlet delivers a low pressure, heated air stream at an operational pressure below 290 psi, preferably between 20 and 290 psi. Generally, the air pressure will be less than 90% of the clamping force.

The confining step may include symmetrical isolation of the forming cavity so that the formed carrier possesses a consistent radius of curvature. Symmetrical isolation may include adjusting the geometry of the shroud so that the distance from the mold insert's periphery to the shroud is equal and symmetrical in all radial directions.

At the end of the molding the cycle, the method includes unclamping the platens and annealing the carrier at a temperature between 50 and 275 degrees F. for between 5 and 15 minutes to relax internal stresses and provide better mold replication.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF PREFERRED EMBODIMENTS

Figure 1:
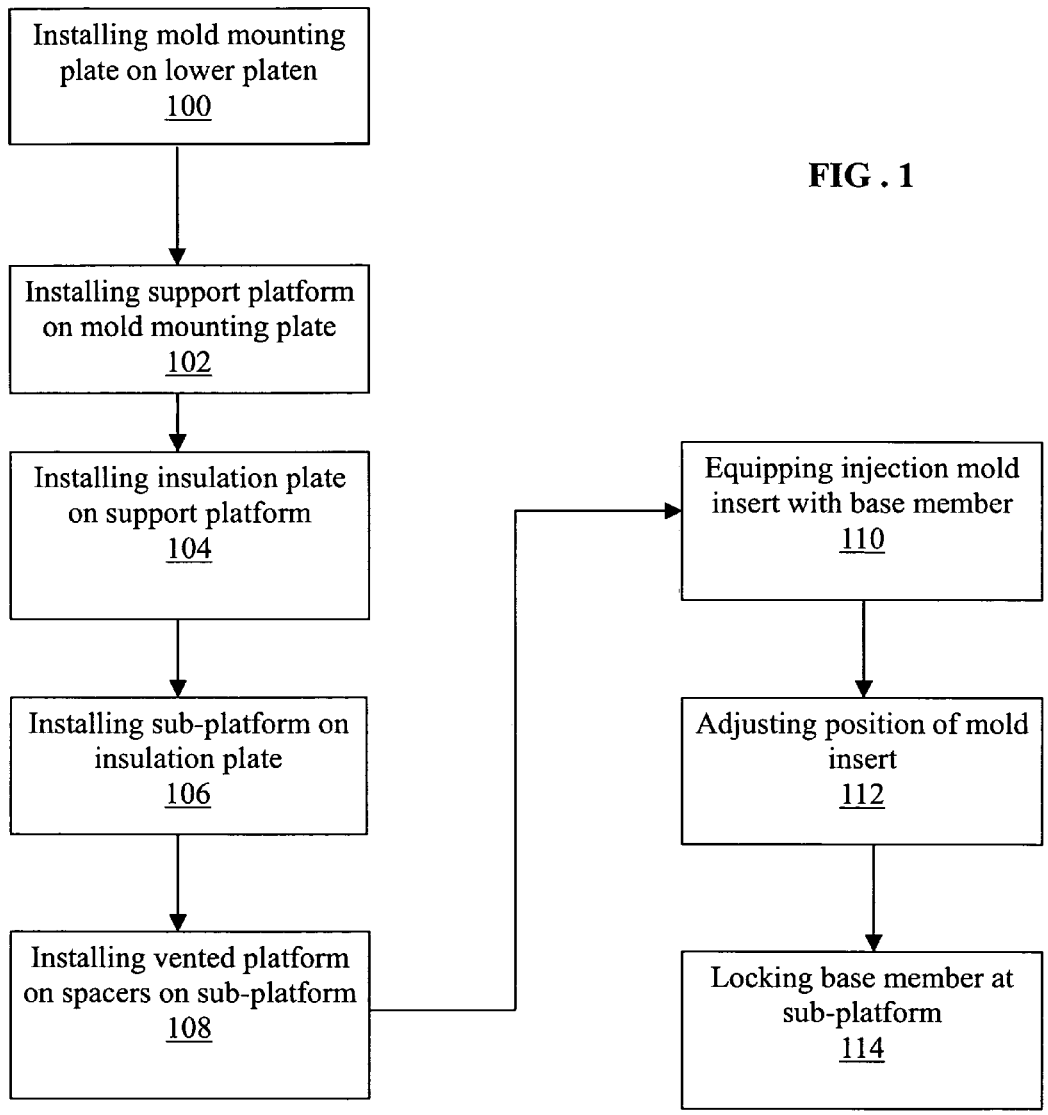
FIG. 1 is a flow chart showing pre-forming steps for configuring the thermoforming equipment on the lower platen.
Figure 4:
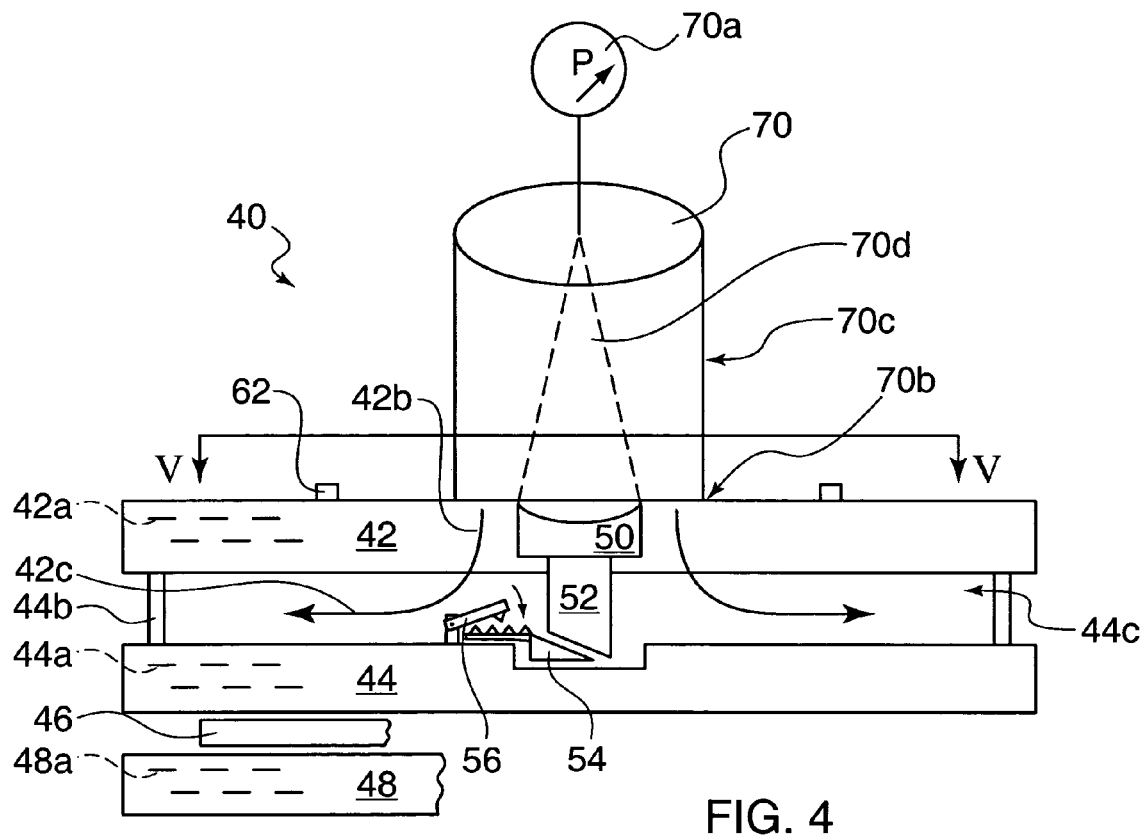
FIG. 4 is a schematic drawing illustrating the configuration of equipment for carrying out the thermoforming method according the invention.

Referring now in detail to the flowcharts and drawings, and in particular FIGS. 1 and 4, there is shown an assembly within the platens of the thermoforming machine, referred to generally by reference numeral 40. The platens and corresponding controls of thermoformers are well known and commercially available, for example, from DT Sencorp. For the sake of clarity, only the equipment within the platens will be shown. Starting with the lower platen, step 100 calls for installing a mold mounting plate on the lower platen. In step 102, a support platform 48 is mounted onto the mold mounting plate followed by an insulation plate 44, per step 104. In step 106, a sub-platform 44 is installed followed by spacers 44b and a vented platform 42 (step 108).

A mold insert 50 is equipped with a base member 52 (step 110). The mold insert 50 and base member 52 are lowered through an aperture in vented platform 42, through the gap formed by spacers 44b, into a receiving port formed within sub-platform 44. The height of mold insert 50 is adjusted or shimmed via adjustment 54 (step 112) so that the highest point of mold insert 50 is even with the top surface of vented platform 42. Base member 52 is then locked into position via lock 56 (step 114). The spacing afforded by spacers 44b allows standard injection molding inserts to be used in this thermoforming application.

Figure 2:
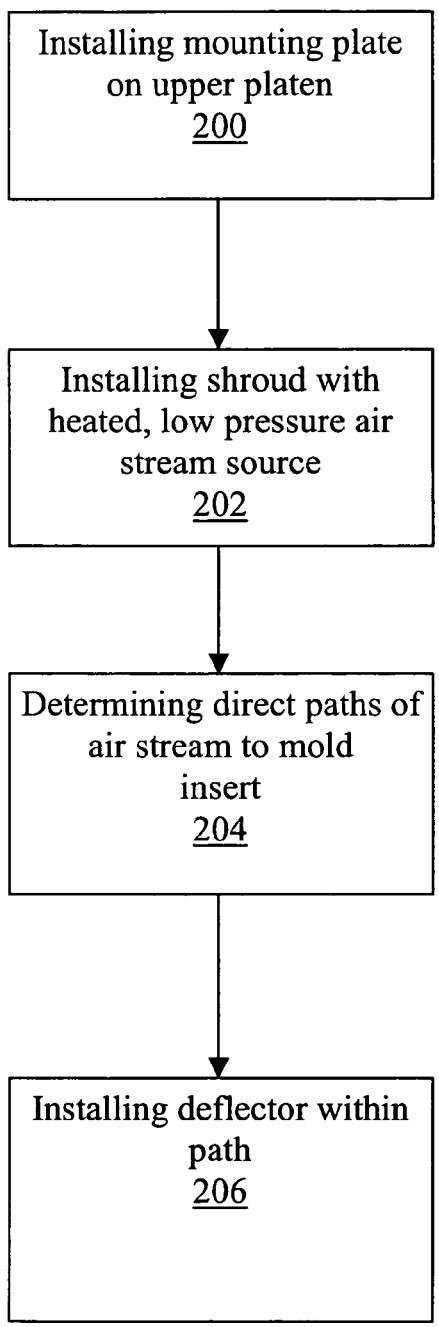
FIG. 2 is a flow chart showing pre-forming steps for configuring the thermoforming equipment on the upper platen.

FIG. 2 outlines the steps for installing equipment onto the upper platen. Step 200 calls for the installation of a mounting plate, followed by the installation of a shroud 70 (step 202) equipped with a heated, low pressure air source. In step 204, the direct paths 70d of the air stream to mold insert 50, upon closing the platens, is determined. In step 206, a deflector is installed within at least part of the path.

Figure 3:
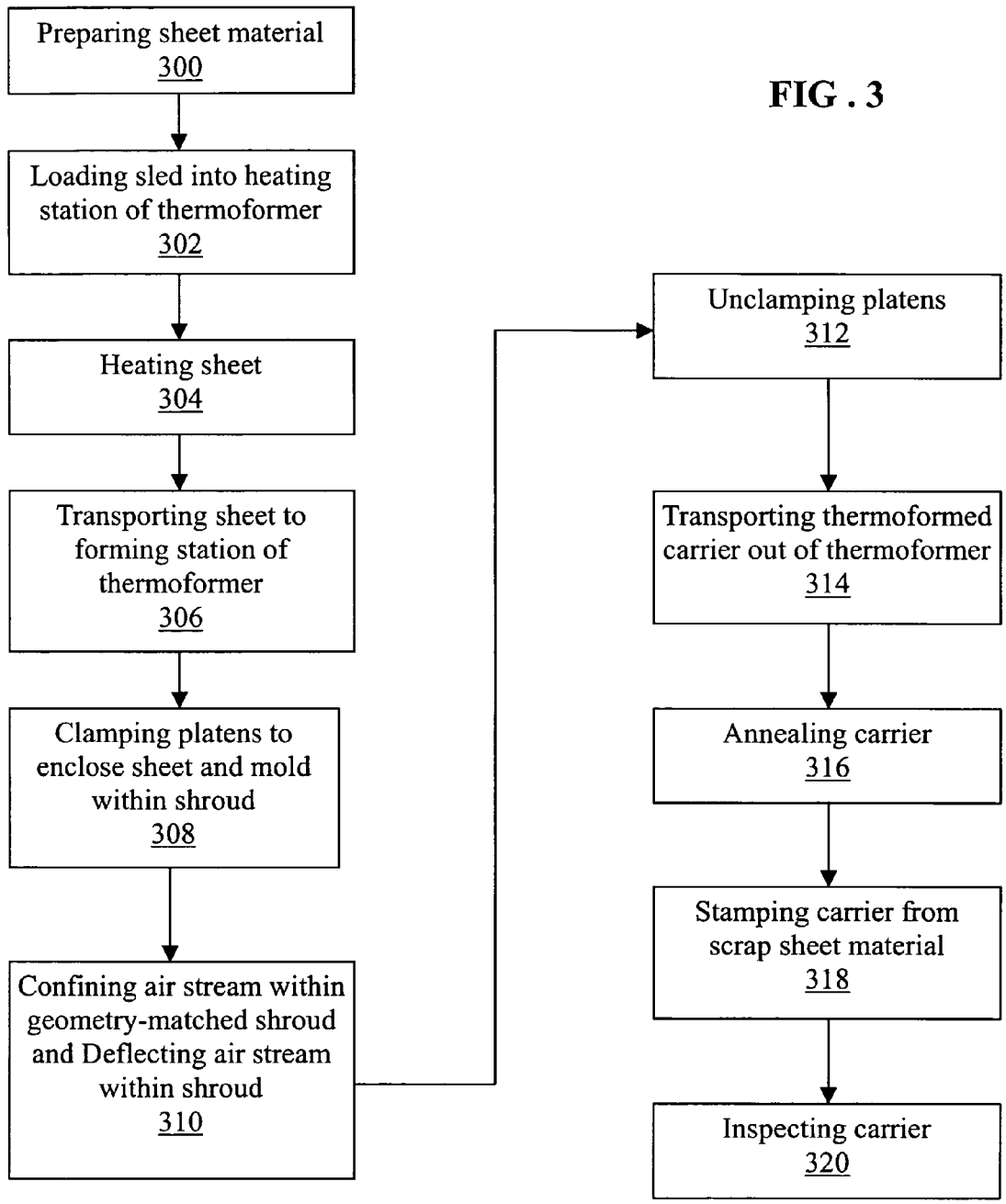
FIG. 3 is a flow chart showing the sequence of steps occurring throughout the thermoforming process.
Figure 5:
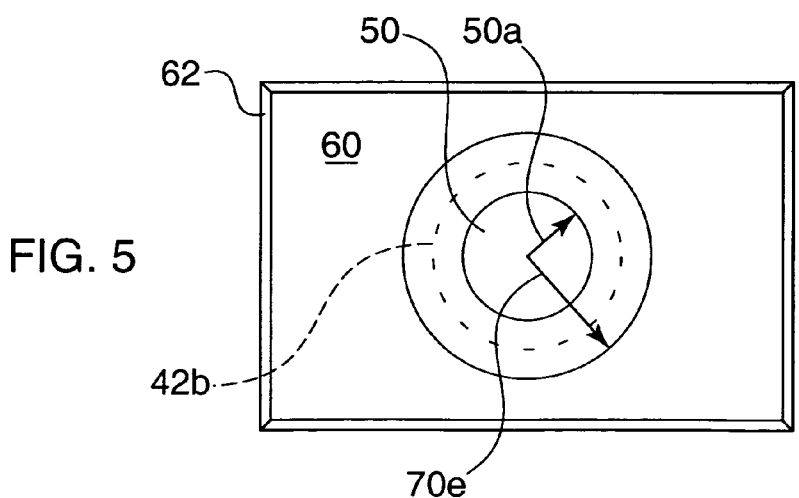
FIG. 5 is a schematic drawing taken along the line V-V from FIG. 4, illustrating the relationship between the mold insert and the shroud.

FIG. 3 outlines the steps for the actual thermoforming, according to the invention. A thermoplastic sheet material is prepared in step 300, which may include cutting a section of sheet from a roll, removing a protective film within a HEPA air-flow controlled environment, and fixturing the sheet. FIG. 5 schematically illustrates a prepared sheet 60 within a fixture, frame or sled 62. In step 302, sled 62 is loaded into the heating station of the thermoformer. In step 304, the sheet is heated to, or just above, its glass transition temperature, for example. The process is useful in thermoforming thin thermoplastics ranging in thickness from about 0.010 inches to about 0.10 inches. Exemplary materials are polyamide, polycarbonate/polyester blends, olefin copolymers and polycarbonate. Other optically transparent, formable, thermoplastics may be employed. In a practical test run, polycarbonate sheet of 0.020 thickness was utilized.

In one embodiment, IR radiation heating quickly heats the sheet. For example, the wavelength of the IR radiation source may be tuned to the natural absorption band of the thermoplastic. The sheet may be heated to a temperature range of 80 degrees to 250 degrees F. within about 15 seconds. Rapid heating is critical to reduce the time between removing the sheets protective film and thermoforming, so as to avoid contamination which can negatively affect the quality of the formed carrier. Next in step 306, the sheet is transported into the forming station of the thermoformer, where it is located over mold insert 50, for example as shown in FIG. 5. In step 308, the platens are clamped to enclose sheet 60 and thermoform same within shroud 70. For example, the platens are clamped with less than 300 psi, preferably 70 to 85 psi clamping force on the lower platen and the same 70 to 85 psi clamping force on the upper platen. The equipment is now in the configuration shown in FIG. 4.

The low pressure air stream source 70a is activated and confined (step 310) within a shroud having a geometry matched to the mold insert's periphery. At the preferred clamping force of 70 to 85 psi, the air stream is pressurized to between 60 and 80 psi and to a temperature between 100 and 130 degrees F. FIG. 5 shows the mold insert 50 as having a circular periphery. Accordingly, shroud 70 includes a matching circular shape at its open end 70b, or at a cross-section 70c somewhere along its height, as shown in FIG. 4. In one embodiment, shroud 70 is cylindrical, whereby it includes a circular geometry at all cross-sections 70c along its height as well as at its open end 70b. FIG. 5 shows the relationship between the lower portion of shroud 70 and mold insert 50. Mold insert 50 has a radius r (50a) from its central axis out to its periphery. Shroud 70 has a larger radius R, (70e), measured from the same central axis.

The confining step 310 includes confining the air stream within a shroud having a radius R that is less than two times r, i.e. R<2r. This relationship is extended to include the cross sectional areas of the mold insert and the shroud as follows:

$$\text{Mold insert area} = \Pi r^2$$

Note that we are interested in the area measured in the plane of the insert mold's periphery, and not the convex or concave surface area of the mold face.

The cross-sectional area within a parallel plane of shroud 70 is represented by:

$$\text{Shroud area} = \Pi R^2$$

Where R=2r, i.e. the maximum, $$\text{Shroud area} = \Pi (2r)^2$$

In other terms,

Shroud area=Π(2r)*(2r)

Or,

Shroud area=Π4r²

Accordingly, the shroud area is less than Π4 r².

When comparing mold area to shroud area the ratio is represented by:

$$\frac{\text{Mold area}}{\text{Shroud area}} = \frac{\Pi r^2}{\Pi 4 r^2}$$

In other terms:

$$\frac{\text{Mold area}}{\text{Shroud area}} = \frac{1}{4}$$

Accordingly, the shroud area is less than four times the mold insert area.

Simultaneously with the activation of the air stream in step 310, the air stream is deflected by a deflecting member located at some point within direct path 70d. For a point air stream source 70a, located along the central axis of mold insert 50, the complete group of direct paths 70d, form a cone. A deflecting member is attached to the inner surface of shroud 70 with a portion of same extending into the cone. Deflecting member may be any suitable baffle, plate or screen. Alternatively, the deflecting member may be a diverter tube coupled to the air inlet which diverts the air stream out of the cone. If the air stream impinges directly on the sheet, it causes a ripple defect, characterized by wavy distortions in the otherwise uniformly thick film. The ripples are ultimately transmitted to the protective coating during the BST process. Surprisingly, it was discovered that by deflecting the air stream directed to the concave side of the carrier, the ripple defect was no longer transmitted from the convex service side of the carrier onto the protective coating during the BST process.

Also during step 310, a heated fluid medium is circulated through circulating channels 42a and 44a. In one embodiment, the heated medium flow passes along a single loop through sub-platform 44 and then through vented platform 42. A cooling fluid medium may be circulated through channels 48a. In combination with insulating plate 46, the lower platen is effectively insulated from the thermal heating of platforms 42 and 44. The heating of platforms 42 and 44 causes heating of the gap 44c therebetween along with mold insert 50 and base member 52. Gap 44c is in communication with vents 42b extending through the height of platform 42, as most clearly seen in FIG. 5. The heated medium may be in an operational temperature range of 100 degrees F. to 200 degrees F., preferably between 115 degrees to 145 degrees F. Whereby the gap, mold insert and underside of the sheet may be heated to a temperature range of 80 to 180 degrees F., preferably 100 to 130 degrees F. The heated air stream from source 70a, may heat the topside of the sheet to a similar temperature range of 100 to 130 degrees F.

During thermoforming, trapped air underneath the sheet may escape through vents 42b along path 42c. FIG. 5 shows vents 42b located beyond the periphery of mold insert 50, i.e. at a vent radius V, measured from the central axis, where r<V<R. In other terms, vents 42b are located in the area (calculated above) between the mold insert periphery and the shroud open end 70b, when projected onto the surface of vented platform 42.

After the shroud is pressurized to 20 to 290 psi for between 1 to 30 seconds, the thermoforming is complete and the platens are unclamped in step 312. The thermoformed carrier is transported out of the thermoformer (step 314). In step 316, the carrier is annealed at a temperature between 50 degrees and 270 degrees for 5 to 15 minutes to relax internal stresses and provide for better mold replication. In step 318, the carrier is cut or stamped out of the sheet before proceeding to inspection (step 320). Acceptable carriers are utilized in a BST-HMC process, as detailed in U.S. Pat. No. 6,562,466, the entire contents of which are incorporated herein by reference thereto.

The method just described may be scaled up to thermoform two or more carriers within a single thermoforming cycle. In an exemplary embodiment, platform 42 is equipped with four mold inserts and the upper platen is equipped with four shrouds. Sheet 60 and sled 62 may be four times larger to effectively cover the four mold inserts. During simultaneous thermoforming, each of four air streams is confined within a geometry matched shroud, and the air stream within each is deflected from a direct path leading directly to the respective mold inserts.

By confining the air stream within a geometry matched shroud, the method according to the invention has increased efficiency from a low pressure air stream. Heretofore, acceptable yields were only possible with high pressure thermoforming techniques, and the attendant complexities and high capital and operating costs. In a comparison of 4 base carriers, the high pressure thermoforming yielded 12 of 12 acceptable coated lenses (with 7 samples over the predetermined tolerance), while the low pressure thermoforming according to the invention yielded 9 of 12 acceptable coated lenses (with only 2 of the acceptable samples over the predetermined tolerance). In a comparison of 5 base carriers, the high pressure thermoforming yielded 11 of 12 acceptable coated lenses, while the low pressure thermoforming according to the invention yielded 10 of 10 acceptable coated lenses (with only 2 of the samples over the predetermined tolerance). In a comparison of 6 base carriers, the high pressure thermoforning yielded 11 of 12 acceptable coated lenses (with 2 of the acceptable samples over the predetermined tolerance), while the low pressure thermoforming according to the invention yielded 14 of 14 acceptable coated. In a comparison of 7 base carriers, the high pressure thermoforming yielded 12 of 12 acceptable coated, while the low pressure thermoforming according to the invention yielded 10 of 12 acceptable coated.

The inventive method provides a thin carrier, at optical quality, with uniform thickness. Uniformity of thickness is characterized by a mean center thickness of 0.47 mm (from a 0.508 mm sheet) and a maximum thickness difference of 0.01 mm with a standard deviation of 0. Optical quality is characterized by: low sphere measurements having a mean of −0.01 diopters and a standard deviation of 0.03; low cylinder measurements having a mean of −0.01 diopters and a standard deviation of 0.03; and a low prism measurement having a mean of 0.11 diopters and a standard deviation of 0.01. A further characterization of optical quality consists of a $R_1$ Radius having a mean of 87.26 mm with a standard deviation of 2.55 mm, and a difference in radii of 4.37 mm with a standard deviation of 2.07. While thin, the carriers formed according to the invention were formed with molecular weight thermoplastic exceeding 22,000 Daltons while maintaining a favorable storage modulus, within the range of much lower molecular weight thermoplastics.

Having described preferred embodiments for low pressure thermoforming of thin carriers of optical quality and uniform thickness expressed as methods and systems (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for thermoforming a thin thermoplastic carrier with uniformity of thickness at optical quality comprising the steps of:
    locating a heated sheet on a vented platform equipped with a mold insert that is adjustably disposed though an aperture and clamping the thermoformer's platens to clamp a shroud having a geometry matched to the mold insert's periphery over the heated sheet onto the vented platform;
    confining a low pressure air stream within the shroud with the vents being located between the aperture and the shroud; and
    deflecting the air stream from a path leading directly to the mold insert thereby thermoforming the sheet to produce a uniformly thick optical carrier at optical quality.

2. The method of claim 1, further comprising the step of:
    circulating a heating medium through circulating channels within the vented platform and through circulating channels within a sub-platform spaced from the vented platform to form a gap therebetween which communicates with the vents.

3. The method of claim 2, wherein the heating medium has a temperature in the range of 100 degrees F. to 200 degrees F., and wherein the heating of the vented platform raises the air temperature in the vicinity of the mold insert to about 80 to 180 degrees F.

4. The method of claim 2, wherein the heating medium has a temperature in the range of 115 degrees F. to 145 degrees F., and wherein the heating of the vented platform raises the air temperature in the vicinity of the mold insert to about 100 to 130 degrees F.

5. The method of claim 2, wherein said vented platform heats one side of the sheet and the air stream heats the other side of the sheet, wherein the air stream is about 100 to 130 degrees F.

6. The method of claim 2, wherein prior to said locating step, the method further comprises the steps of:
    equipping an injection mold insert with a base member;
    installing the base member through the vented platform and gap into a receiving port formed within the sub-platform;
    adjusting the position of the mold insert to lie even with the vented platform surface; and
    locking the base member into position within the receiving port.

7. The method of claim 2, further comprising the steps of:
    circulating a cooling medium through channels within a support platform; and
    sandwiching an insulating plate between the sub-platform and the support platform.

8. The method of claim 1, wherein prior to said locating step, the method comprises:
    removing a protective film from the sheet;
    fixturing the sheet within a sled; and
    heating the sheet to at least its glass transition temperature.

9. The method of claim 8, wherein said removing, fixturing, heating and locating steps occur within a positive HEPA airflow environment.

10. The method of claim 9, wherein said heating step comprises:
    IR heating the sheet for less than about 15 seconds at a rapid rate to reduce the time between said removing step and said locating step.

11. The method of claim 10, wherein said rapid heating comprises:
    IR heating the sheet to a temperature between 80 and 250 degrees F. by radiation at a wavelength tuned to the thermoplastic's absorption band.

12. The method of claim 1, wherein said locating step comprises:
    providing a sheet between 0.01 and 0.10 inches thick that is heated to at least the glass transition temperature of the sheet 13. The method of claim 1, wherein said clamping step comprises:
    exerting between 22 and 300 psi similar clamping force onto each platen.

14. The method of claim 13, wherein said confining step includes:
    pressurizing said shroud with a low pressure air stream comprising an air pressure less than about 90% of the clamping force.

15. The method of claim 1, wherein said confining step includes
    pressurizing the shroud with a low pressure air stream less than about 290 psi.

16. The method of claim 1, wherein said clamping step comprises exerting between 70 and 85 psi similar clamping force onto each platen; and
    said confining step comprises pressurizing the shroud with a 60 to 80 psi air stream.

17. The method of claim 1, wherein the shroud includes an open end facing the vented platform and having the same geometric shape as the mold insert's periphery.

18. The method of claim 1, wherein the shroud has at least one cross-sectional shape with the same geometric shape as the mold insert's periphery.

19. The method of claim 18, wherein the shroud has a uniform cross-sectional shape along its height.

20. The method of claim 17, wherein the mold insert's periphery is circular with radius r, and the shroud's open end is circular having a radius R, larger than r.

21. The method of claim 20, wherein the shroud is cylindrical.

22. The method of claim 21, wherein the shroud's cross-sectional area is less than two times larger than the area of the mold insert.

23. The method of claim 20, wherein the vented platform's vents are located at a radius V, in which r<V<R.

24. The method of claim 1, wherein said method comprises simultaneously thermoforming several carriers and further comprises the following steps:
    locating a heated sheet on a vented platform equipped with multiple mold inserts;
    providing one geometry-matching shroud for each mold insert; and
    deflecting the air stream within each shroud.

25. The method of claim 1, wherein the air stream emanates from an open inlet located at the top of a cylindrical shroud and all paths leading from the inlet to the mold insert collectively form a cone, and wherein said deflecting step comprises:

positioning a deflector within at least part of the cone.

26. The method of claim 25, wherein the deflector is connected to the shroud interior and is one of a baffle, plate, or screen.

27. The method of claim 1, wherein the air stream emanates from an inlet located at the top of a cylindrical shroud and said deflecting step comprises:

directing the air stream with a diverter installed onto the inlet.

28. The method of claim 1, wherein said confining step comprises symmetrical isolation of the forming cavity so that the formed carrier possesses a consistent radius of curvature.

29. The method of claim 28, wherein symmetrical isolation comprises adjusting the geometry of the shroud so that the distance from the mold insert's periphery to the shroud is equal and symmetrical in all radial directions.

30. The method of claim 1, wherein following said deflecting step the method further comprises the steps of:

unclamping the platens; and annealing the carrier at a temperature between 50 and 275 degrees F. for between 5 and 15 minutes to relax internal stresses and provide better mold replication.

* * * * *